July 1, 1958  G. L. LOOMIS  2,841,007
APPARATUS FOR TESTING OIL WELL CASING OR THE LIKE
Filed Jan. 10, 1955  2 Sheets-Sheet 1
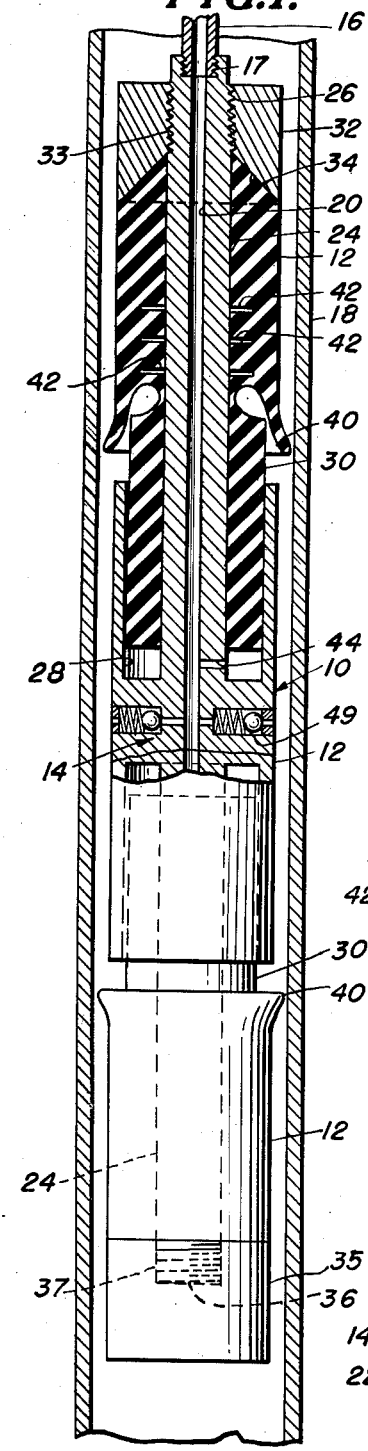
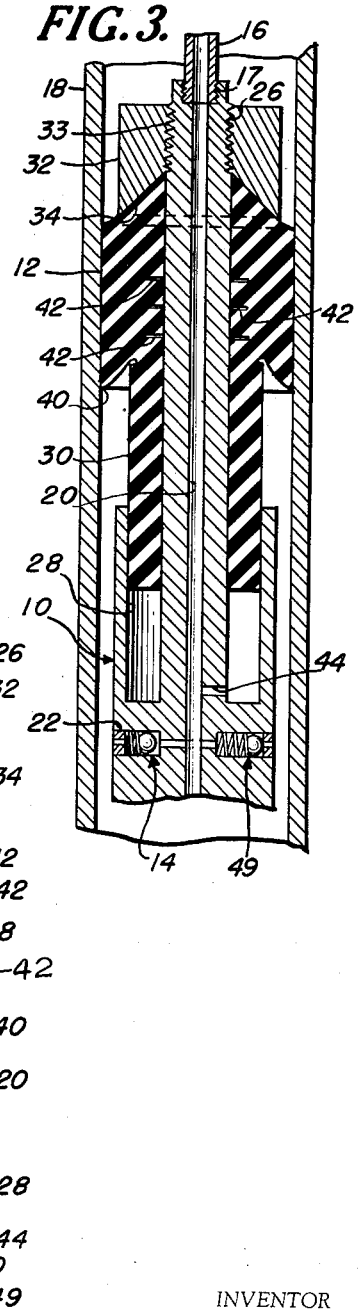
INVENTOR
GLENN L. LOOMIS
BY Cushman, Darby & Cushman
ATTORNEYS July 1, 1958      G. L. LOOMIS      2,841,007
APPARATUS FOR TESTING OIL WELL CASING OR THE LIKE
Filed Jan. 10, 1955      2 Sheets-Sheet 2
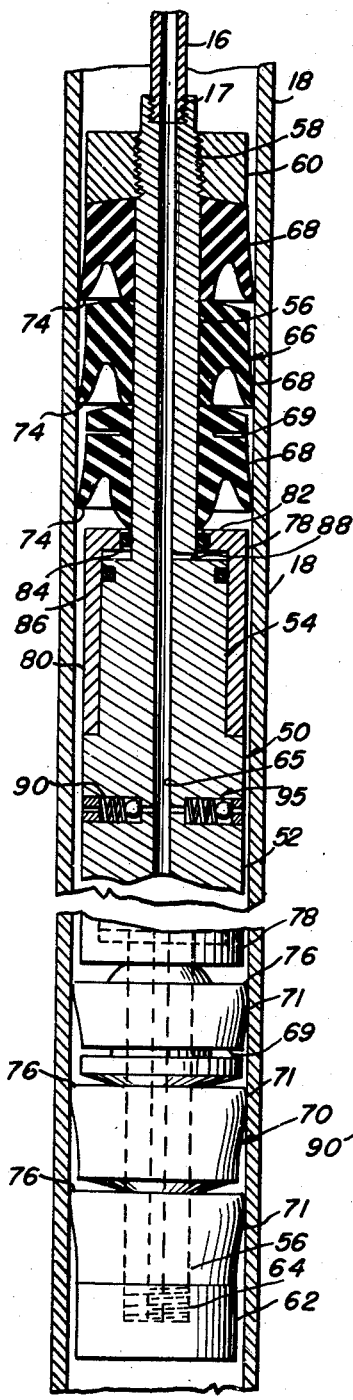
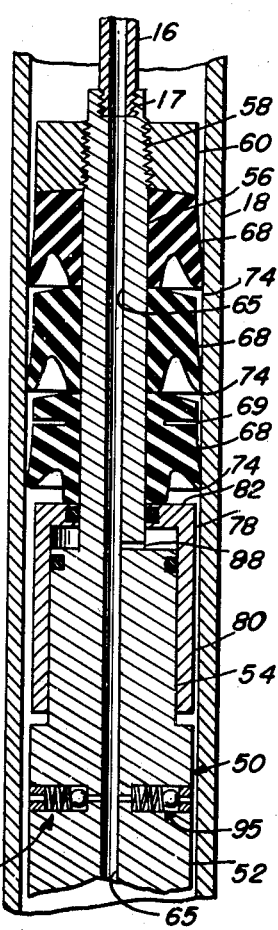
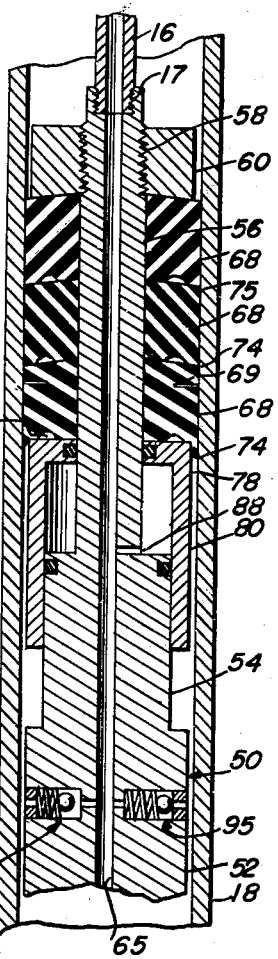
INVENTOR
GLENN L. LOOMIS
BY
Cushman, Darby & Cushman
ATTORNEYS

United States Patent Office 2,841,007
Patented July 1, 1958

2,841,007

APPARATUS FOR TESTING OIL WELL CASING OR THE LIKE

Glenn L. Loomis, McAllen, Tex., assignor, by mesne assignments, to Loomis Hydraulic Testing Co., Inc., a corporation of Texas Application January 10, 1955, Serial No. 480,741

13 Claims. (Cl. 73—40.5)

The present invention relates to a tester apparatus and, more particularly, to a tester apparatus adapted for use in testing sections of oil well pipe or casings for leaks. This application is an improvement of the collar tester apparatus disclosed in my copending United States application Serial No. 266,041, filed January 11, 1952, now United States Patent No. 2,731,827.

In present day drilling of wells, it is highly desirable to test the well casing or pipe as it is being run so that each section or stand, as well as its coupling, will be run into the well in a perfect condition. In other words, by testing each stand and coupling or collar at the surface of the well for any leaks, the necessity of withdrawing the string due to a leaky section or coupling once it has been lowered into the well is reduced to a minimum. This method of testing sections of well pipe is disclosed in my aforementioned copending application.

An object of the present invention is to provide an improved tester apparatus which may be inserted into the well pipe as it is being run to test a stand of the well pipe or a collar joint between adjacent stands of well pipe for leaks at pressures expected to be encountered after the pipe has been run.

Another object of the present invention is to provide an improved tester apparatus which may be lowered into a previously run well casing or pipe in any conventional manner for testing a section of the casing at any desired depth below the surface of the well.

Still another object of the present invention is to provide an improved tester apparatus which will seal off a section of well pipe or casing and will inject a test fluid under pressure into the sealed-off section for testing the same, as well as maintaining the seals.

A still further object of the present invention is the provision of a tester apparatus which includes a tester body having packers spaced from each other and mounted exteriorly on the body, the packers being initially compressed longitudinally into sealing engagement with the well pipe adjacent the section to be tested by test fluid under pressure and then the packers being secondarily held in sealing engagement with the walls of the well pipe after the test fluid under pressure has been admitted to the sealed-off section between the packers.

Still another object of the present invention is the provision of a tester apparatus having spaced packers thereon, the spaced packers adapted to seal off a section of the well pipe to be tested, the sealing action of the packers increasing proportionately to the increased pressure of the test fluid being admitted to the space between the packers. By providing packers having a configuration capable of utilizing the test fluid between the packers to further increase the seal, the tester apparatus may be used with very high pressures without the danger of blow by the packers.

These and other objects of the present invention will appear more clearly in the following specification, claims and drawings in which:

Figure 1 is a view partially in elevation and partially in cross section of the test apparatus lowered into a well casing and prior to the application of the test fluid thereto;

Figure 2 is a fragmentary cross sectional view of the upper portion of the tester apparatus disclosed in Figure 1 but illustrating the phase of operation of the tester apparatus wherein the packer members are pressed into initial sealing engagement with the wall of the well casing;

Figure 3 is a fragmentary cross sectional view similar to Figure 2 but disclosing the secondary sealing of the packer members after the test fluid has entered the section between the spaced packers;

Figure 4 is a modified form of the invention disclosed in Figure 1, the view being partially in elevation and partially in cross section;

Figure 5 is a fragmentary sectional view of the upper portion of the tester apparatus disclosed in Figure 4, but illustrating the phase of operation of the tester apparatus wherein the packer members are pressed into initial sealing engagement with the wall of the well casing; and Figure 6 is a fragmentary cross sectional view similar to Figure 5 but disclosing the secondary sealing of the packer members after the test fluid has entered the section between the spaced packers.

Referring now to the drawings wherein like character or reference numerals represent like or similar parts, the tester apparatus disclosed in Figure 1 includes an elongated tester body, generally indicated by the numeral 10, having a longitudinal bore 20 therein, a pair of spaced packer members 12 mounted exteriorly of the tester body, and valve means 14 positioned in the tester body intermediate the spaced packer members 12. Packer members 12 may be made of an elastomeric material, such as rubber, synthetic rubber or the like. The testing apparatus is connected to a conduit of flexible tubing 16 or the like, which is adapted to support the tester apparatus, as indicated at 17, in the well adjacent the section of well pipe casing 18 that is to be tested. The tester apparatus supported on tubing 16 may be fed downwardly into the well pipe casing 18, as disclosed in my aforementioned copending application, the other end of the tubing 16 being connected to suitable apparatus for supplying a hydraulic fluid under pressure to the tester apparatus.

It will suffice to say that the subject matter of my aforementioned copending application pertaining to the method and means for lowering the test apparatus into the casing or well pipe and the method of testing will not be repeated herein, it being understood that the copending application referred to above, discloses such a method and apparatus for use with the present invention, and to that extent it forms a part of the present disclosure.

Once the tester apparatus of Figure 1 has been positioned in a section of well pipe, at a desired location, test fluid is applied through the tube 16 into the bore 20 of the tester body. The test fluid will first cause the packers 12 to be expanded into sealing engagement with the walls of casing 18, thus, initially sealing off the section of well pipe to be tested. After pressure in the line 16 and in the central bore 20 of tester body 10 has reached a predetermined value, the valve means 14 will open, permitting the test fluid to enter the sealed-off section of well pipe. This fluid in the sealed-off section of well pipe will act in both an upward and downward direction against the upper and lower packer members thereby causing a secondary sealing action of the packers 12 which will be explained in more detail later in the specification. The pressure of the test fluid can then be increased to any desired amount to perform the testing operation. If the section of well pipe is above the surface of the well, a visual inspection of the casing can be made for indications of a leak or a leak can be determined by a drop in pressure registering on a pressure gauge (not shown) at the surface of the well. Of course, if the casing 18 has already been run, then the tester apparatus can be lowered into the well to test the same.

Referring in detail to Figures 1, 2 and 3, tester body 10 is provided with a central section or portion 22 of a diameter substantially smaller than the diameter of the casing 18 which is to be tested. Extending longitudinally from each end of the central section or portion 22 of tester body 10 are two elongated cylindrical stems 24 threaded at their free ends, as indicated at 26. The diameter of the stems 24 is considerably less than the diameter of the central portion 22. Provided on each end of the central portion 22 of tester body 10 is a longitudinally and inwardly extending annular recess 28, a portion of each stem 24 defining one of the walls of the recess 28.

The upper and lower packer members 12 are slidably mounted on the stems 24 of tester body 10 and each has an elongated cylindrical portion 30 adapted to be received in the recesses 28. A retaining ring or nut 32 having a threaded bore 33 extending therethrough is threaded on the end of the upper stem 24, the nut being provided with a conical tapered surface 34 which is adapted to receive the conical tapered end of the upper member 12. As clearly shown in Figure 1, the retaining ring 32 prevents longitudinal upward movement of packer member 12. A similar retaining ring 35, but having a threaded bore 37 extending only part-way therethrough, is threaded onto the end of lower stem 24. By having the bore 37 extend only part-way through ring 35, the longitudinal bore in tester body 10 is closed at its lower end, as indicated at 36. Of course, the lower end of bore 20 could be plugged in any other suitable manner. Retaining ring 35 prevents longitudinal downward movement of lower packer member 12.

Each of the packer members 12 is identical in shape but is oppositely disposed on the tester body 10. It will be noted from Figure 1 that each of the packer members 12 is provided with an annular outwardly flaring flanged lip 40. The lip 40 of the upper packer member 12 is oppositely disposed from the lip 40 of the lower packer member 12 in such a manner that fluid entering the section between the packer members will act against the undersurface of the lips. Also, each lip 40 is positioned on its packer member so that it will be adjacent the end of the center portion 22 of tester body 10. Each of the packer members 12 is provided with a plurality of longitudinally spaced annular cuts or grooves 42 extending radially outwardly from the bore through the packer members.

Adapted to communicate with the inner end of each of the recesses 28 of the central portion 22 of tester body 10 is a transversely extending passage 44. As best shown in Figure 1, the passage 44 places the bore 20 in communication with the recess 28 below the inner end of the reduced portion 30 of the packer members 22. Thus, when hydraulic fluid is applied to the bore 20, it will flow outwardly through each of the passages 44 into the recess and, thus, cause the packer members 22 to be compressed against the retaining rings 32 and 35. Packers 12 will, thus, expand as shown in Figure 2 and the lips thereof will make initial sealing engagement with the wall of casing 18.

Further introduction of fluid into bore 20 will increase the pressure to a predetermined value at which time the previously mentioned valve means 14 will open, communicating the interior of bore 20 with the sealed-off section between packers 12. Valve means 14 may be a spring loaded ball valve, such as disclosed in Figure 1; however, any other suitable type of pressure responsive valve can be used, such as a spring loaded flap valve or the like and still be within the scope of the invention.

The operation of the tester apparatus disclosed in Figures 1 to 3 may be briefly described as follows:

First the tester device is lowered into position in a section of the well casing 18 by the conduit 16, as shown in Figure 1. It may be positioned so that the packer members 12 are positioned on either side of a collar joint or it may be positioned to test the strength of the section of well pipe by itself. Hydraulic fluid is pumped into the tester body through conduit 16 and this fluid will first pass through the passages 44 causing the packers to move longitudinally against the packer retaining rings 32 and compress. As shown in Figure 2, compression of the packer members 12 will cause the lip portions 40 of the packer members to expand laterally into initial sealing engagement with the well pipe. Continued application of fluid to the longitudinal bore 20 of tester body 10 will continue to force the packers longitudinally outwardly against retaining rings 36. However, when the pressure of the testing fluid has reached a predetermined value, valve means 14 will open permitting the passage of testing fluid into the sealed-off area between packer members 12. Referring now to Figure 3, after valve 14 opens, the pressure of the testing fluid continues to increase and as it increased it will act on the underneath surface of the lips 40 to provide a seal, as well as acting longitudinally on the portion 30 of the packer members 12 so as to compress the packer members against the packer retaining rings 32 and 35. The packer members 12 will then assume the position shown in Figure 3 forming a tight seal so that any desired test pressure can be applied to the section being tested. It might be noted that an increase of pressure to the section sealed off between the packer members 12 will not cause a blow by the packer members 12 because the pressure will be applied beneath the lips of the packer members and, consequently, the seal of the packers is made even tighter. Further, it will be noted that the longitudinally spaced grooves permit the compression of the packer members so that the packer will not seize against the stem 24 of body member 10 as it is compressed against the retaining rings 32 and 35.

In order that the tester apparatus disclosed in Figure 1 may be removed from the well casing after the test is completed, a second valve means 49 is provided in the center portion 22 of tester body 10. This valve means is spring operated to the closed position and permits the flow of test fluid from between the upper and lower packers 12 to the longitudinally extending bore 20 when the pressure of the test fluid in the bore 20 has been reduced. In other words, there will be no chance of the test fluid at the test pressure between the upper and lower packers being trapped by closing of the valve 14 as soon as pressure is reduced in bore 20. As soon as pressure of the test fluid between the packer members 12 has been relieved, the packer members will return to the relaxed position, shown in Figure 1, and the tester apparatus can be moved to a new position in the casing or removed therefrom.

Referring now to Figures 4, 5 and 6, the modified form of tester apparatus disclosed therein includes an elongated tester body generally indicated at 50, the tester body having a center section or portion 52 of slightly less diameter than the casing 18 which is to be tested. Extending from each end of the center portion 52 of tester body 50 are intermediate portions 54 of slightly reduced diameter than the center portion 52. Elongated cylindrical stems 56 extend from each of the intermediate portions 54 of tester body 50. The stems 56 are threaded at each end, as indicated at 58, and are adapted to receive upper and lower packing retaining rings or nuts 60 and 62, respectively. The upper retaining ring 60 is provided with a threaded bore therethrough so that the upper stem 56 can extend therethrough and have the tubular conduit 16 threaded thereon, as indicated at 17. The lower packer retaining ring 62 is provided with a threaded bore 64 which extends only part way through the ring so that the lower end of the longitudinally extending bore 65 in tester 50 is closed.

A packer member 66 comprising a plurality of packer elements 68 is mounted exteriorly of the upper stem 56 and a like packer member 70 comprising a plurality of packer elements 71 is mounted exteriorly of the lower stem 56. Each of the packer elements 68 is provided with an annular outwardly flaring lip 74, the undersurface of each of the lips 74 of the packer member 66 facing toward the center portion 52 of tester body 50. In like manner, the lower packer member 70 has its packer elements 71 provided with outwardly flaring lips 76 with their undersurfaces facing toward the center portion 52 of tester body 50. In other words, the lips of the packer elements 68 are oppositely disposed from the lips of the packer elements 71 in such a manner that fluid entering the section to be sealed off will act against the undersurface of the packer lips.

A cup-shaped piston member 78 is longitudinally slidable on each of the intermediate portions 54 of tester body 50. Each of the piston members 78 is provided with a cylindrical skirt 80 and a head portion 82 which acts against the undersurface of the innermost packer elements 68 and 71. Suitable O-ring seals or gaskets 84 are provided in the piston head 82 so as to provide a seal between the head and the stems 56. A suitable O-ring seal 86 is provided on each of the intermediate portions 54 so as to provide a seal between the cylindrical skirts 80 of the pistons 78 and the intermediate portions 54 of tester body 50.

A laterally extending passage 88 is provided in each of the stems 56 adjacent the point where the stems integrally connect with the intermediate portions 54 of tester body 50. The passages 88 place the undersurface of the head 82 of pistons 78 in communication with the longitudinally extending bore 65.

Each of the packer elements 68 and 71 of packer member 66, which is in abutting relationship with the heads 82 of pistons 78, is provided with a deep circumferential groove 69. The purpose of groove 69 will be explained in more detail later in the specification.

A pressure responsive valve 90 is provided in the center portion 56 of tester body 50 for placing the bore 65 in communication with the section between the packer members 66 and 70 so as to permit flow of test fluid from the bore 65 when the fluid has obtained a predetermined pressure. A second pressure responsive valve 95 is provided in the center portion 56 of tester body 50, but this valve permits flow only from the outside of the tester apparatus to the bore 56 when pressure is relieved in bore 56. Valves 90 and 95 may be the spring-pressed ball type, as shown in Figure 4, or they may be of any other suitable pressure responsive type.

The operation of the tester apparatus disclosed in Figures 4, 5 and 6 is substantially similar to the previously discussed operation of the apparatus disclosed in Figures 1, 2 and 3. The tester apparatus is lowered into the casing 18 in the same manner as the tester apparatus of Figure 1 to a desired position. Test fluid is supplied to the tester apparatus through the conduit 16 and the longitudinally extending bore 65. Valve 90, which is spring urged to the closed position, is set so that test fluid in bore 65 will not immediately open the same to permit flow of test fluid to the exterior of the test apparatus. Consequently, the test fluid will initially pass through the laterally extending passages 88 causing each of the pistons 78 to move longitudinally away from the center portion 52 of tester body 50. As shown in Figure 5, this outward movement of piston 78 will cause the packer elements of each of the packer members 66 and 70 to compress against the packer retaining rings 60 and 62 so that the lips of each of the packer members 66 and 70 will be expanded laterally into initial sealing engagement with the walls of casing 18.

After the pressure of the test fluid has increased to a predetermined value at which valve means 90 operates, the valve will open permitting the testing fluid to flow into the sealed-off section between the upper packer member 66 and the lower packer member 70. As the pressure of the test fluid is increased to the desired test pressure, the piston members 78 will continue to move longitudinally outwardly away from the center portion 52 of tester body 50. Also, the test fluid between the upper and lower packer members 66 and 70, respectively, will act on the undersurface of the lips of the packer elements, consequently, causing them to expand outwardly into tighter sealing engagement. Just as in the aforementioned embodiment disclosed in Figure 1, an increase in pressure of the test fluid will merely cause an increase in the sealing power of the packer members 66 and 70 until they assume the position disclosed in Figure 6. It will be noted that the external annular groove 69 on the packer element adjacent the piston will have been compressed closed and this will permit further expansion of the piston member so as to obtain maximum sealing of each of the packer elements.

The second valve means 95 provided in the center portion 52 of tester body 50 is oppositely disposed from the valve means 90 and permits a flow of fluid from the outside of the tester apparatus to the center bore 65. However, this valve will not operate as long as pressure is maintained in bore 65. When the pressure is relieved in bore 65, valve 90 closes and valve 95 will open to permit pressure to bleed off of the section between the packer members 66 and 70. After the pressure has been bled off of the section between the packer members, the packer members will resume their normal relaxed shape and will cause the piston member 78 to move longitudinally toward each other and the center portion 52 of tester body 50, as shown in Figure 1. The tester apparatus can then be moved in the well casing to a new position or it can be removed.

The terminology used in the specification is for the purpose of description and not limitation, the scope of the invention being defined in the claims.

I claim:

1. In an apparatus adapted for testing sections of well pipe or the like with a testing fluid, an elongated tester body of substantially smaller diameter than the diameter of the pipe to be tested and having a longitudinally extending bore therein closed at its lower end, spaced packer members mounted exteriorly on said tester body and having a normal exterior diameter less than the diameter of the pipe to be tested to thereby provide annular clearance therebetween, said packer members having peripheral lips which are oppositely disposed to each other, means on each end of said tester body to retain and limit longitudinal movement of said packer members, said last mentioned means having a diameter substantially equal to the diameter of said spaced packer members, means continuously responsive to fluid pressure in the bore of said tester body for causing said packer members to compress longitudinally against said retaining means and expand transversely into initial sealing engagement with the wall of the pipe to thereby seal off a section of pipe to be tested, means positioned in said tester body intermediate of said spaced packer members and operable in response to a predetermined pressure of testing fluid higher than the pressure of testing fluid necessary to initially cause said packers to compress longitudinally and expand transversely into sealing engagement with the well pipe, said last mentioned means when operable permitting testing fluid to enter the sealed-off section between said packers and flow underneath the lips of said packers so as to couple with the operation of said means continuously responsive to fluid pressure for maintaining said packers in sealing engagement with the well pipe while the section of well pipe is being tested.

2. In an apparatus adapted for testing sections of well pipe or the like with a testing fluid, an elongated tester body of substantially smaller diameter than the diameter of the pipe to be tested and having a longitudinally extending bore therein closed at its lower end, spaced packer members exteriorly mounted on said tester body and having a normal exterior diameter less than the diameter of the pipe to be tested to thereby provide annular clearance therebetween, said packer members having peripheral lips which are oppositely disposed to each other, each of the spaced packer members having peripheral lips which are oppositely disposed to each other, means on each end of said tester body to retain and limit longitudinal movement of said packer members, said last mentioned means having a diameter substantially equal to the diameter of said packer members, means continuously responsive to fluid pressure in the bore of said tester body for causing said packer members to compress longitudinally against said retaining means and expand transversely into initial sealing engagement with the wall of the well pipe thereby sealing off a section of well pipe to be tested, and means positioned in said tester body intermediate said packer members and operable in response to a predetermined pressure of testing fluid higher than the pressure of testing fluid necessary to cause said packer members to compress longitudinally and expand into initial sealing engagement with the wall of the well pipe, said last-mentioned means when operable permitting testing fluid to enter the sealed-off section of well pipe between said packer members to act against the lips of said packer members and assist said means continuously responsive to fluid pressure in maintaining the seal of said packer member while the section between said packer members is being tested.

3. In an apparatus adapted for testing sections of well pipe or the like with a testing fluid, an elongated tester body having a longitudinally extending bore closed at its lower end, said tester body having a central section of increased diameter, said central section being provided with oppositely disposed and longitudinally extending annular recesses, the innermost end of each of the recesses being in communication with the longitudinal extending bore of said body member by laterally extending passages, spaced packer members mounted on the end portion of said tester body, each of said packer members having a longitudinally extending reduced portion adapted to be received in the annular recess on said tester body, means on each end of said tester body to retain and limit longitudinal movement of said packer members, said packer members being compressed longitudinally and expanded transversely into initial sealing engagement with the well pipe when testing fluid is admitted to the recess in said tester body through said transverse passages and longitudinally extending bore, means in said tester body intermediate of said spaced packer members and operable in response to a predetermined pressure of testing fluid higher than the pressure of testing fluid necessary to initially cause said packers to compress longitudinally and expand transversely into sealing engagement with the well pipe, said last-mentioned means when operable permitting testing fluid to enter the sealed-off section between said packers and to further cause said packers to maintain sealing engagement with the well pipe while a section of well pipe is being tested.

4. An apparatus of the character described in claim 3 wherein each of said packer members is provided with at least one peripheral lip, the lips on one of said packer members being oppositely disposed to the lip of the other of said packer members.

5. An apparatus of the character described in claim 3 wherein each of said packer members is provided with at least one interior annular groove.

6. In an apparatus adapted for testing sections of well pipe or the like with a testing fluid, an elongated tester body having a longitudinally extending bore closed at its lower end, said tester body including a central section of diameter smaller than the diameter of well pipe to be tested and end portions having a reduced diameter, a pair of oppositely disposed piston members slidably mounted on said central section of said tester body, a packer member mounted exteriorly on each end portion of said tester body, each packer member comprising a plurality of packer elements, one of said plurality of packer elements of each of said packer members being engaged by the end of said piston member, means on each end of said tester body to retain and limit the longitudinal movement of each packer member, said tester body having a laterally extending continuously open passage therein adjacent each of said piston members whereby testing fluid in the longitudinally extending bore of said tester member can move said piston members to longitudinally compress the packer elements of said packer members and expand them transversely into initial sealing engagement with the wall of the well pipe to thereby seal-off a section of the well pipe to be tested, means intermediate the piston members on said tester body and operable in response to a predetermined pressure of testing fluid higher than the pressure of testing fluid to initially cause said packer members to compress longitudinally and expand transversely into sealing engagement with the well pipe, said last-mentioned means when operable permitting testing fluid to enter the sealed-off section between said packer members and to assist said piston members in maintaining said packers in sealing engagement with the well pipe while the section of well pipe is being tested.

7. An apparatus of the character described in claim 6 wherein each of said plurality of packer elements on each packer member is provided with a peripheral lip, the peripheral lip of the plurality of packer elements on one end of said tester body being oppositely disposed from the peripheral lips of the plurality of packer elements on the other end of said tester body.

8. An apparatus of the character described in claim 6 wherein at least one of the packer elements of each packer member is provided with a circumferential groove.

9. In an apparatus adapted for testing sections of well pipe or the like with a testing fluid, an elongated tester body having a longitudinally extending bore therein closed at its lower end, said tester body having reduced end portions, a plurality of packer elements mounted on each end portion of said tester body, each of said packer elements having a peripheral lip, the lips on the packer elements on one end portion of said tester body being oppositely disposed to the lips on the other packer elements mounted on the other end portion of said tester body, means on each end of said tester body to retain and limit longitudinal movement of said packer members, means continuously responsive to fluid pressure in the bore of said tester body for causing the packer elements on each end portion of said tester body to compress longitudinally against each of the retaining means and to expand transversely into initial sealing engagement with the wall of the pipe to thereby seal off a section of pipe to be tested, means positioned in said tester body intermediate the end portions of said tester body and operable in response to a predetermined pressure of testing fluid higher than the pressure of testing fluid necessary to initially cause said packer elements to compress longitudinally and expand transversely into sealing engagement with the well pipe, said last-mentioned means when operable permitting testing fluid to enter the sealed section between the plurality of packer elements on one end portion of said tester body and the plurality of packer elements on the other end portion of said tester body to assist said means continuously responsive to fluid pressure to maintain said packer elements in sealing engagement with the well pipe while the section of well pipe is being tested.

10. An apparatus of the character described in claim 9 wherein the means responsive to fluid pressure in the bore of said tester body for causing initial sealing engagement of said packer elements includes a piston member slidably mounted on said tester body and engaging said packer elements and a passage in said tester body communicating one side of said piston member with the bore of said tester body whereby testing fluid in the bore of said tester body will cause said piston member to move longitudinally on said tester body to engage and compress said packer elements to thereby expand the same into sealing engagement with the well pipe.

11. In an apparatus adapted for testing sections of well pipe or the like with a testing fluid, an elongated tester body having a longitudinally extending bore closed at its lower end, said tester body including a central section of diameter less than the diameter of well pipe to be tested and end portions having a reduced diameter, a pair of oppositely disposed piston members slidably mounted on the central section of said tester body, at least one packer element mounted exteriorly on each end portion of said tester body, each of said packer elements having a peripheral lip facing toward the central section of said tester body, means on each end of said tester body to retain and limit the longitudinal movement of each packer element, said means having a diameter substantially equal to the diameter of said packer elements, said tester body having a continuously open laterally extending passage therein adjacent each of said piston members whereby testing fluid in the longitudinally extending bore of said tester member can move said piston members to longitudinally compress said packer elements against said packer retaining means and expand them transversely into initial sealing engagement with the wall of the well pipe thereby sealing off a section of well pipe to be tested, means intermediate said piston members on said tester body and operable in response to a predetermined pressure of testing fluid higher than the pressure of testing fluid to initially cause said packer elements to compress longitudinally and expand transversely into sealing engagement with the well pipe, said last mentioned means when operable permitting testing fluid to enter the sealed-off section between said packer elements and to assist said piston members in maintaining said packer elements in sealing engagement with the well pipe while the section of well pipe is being tested.

12. An apparatus of the character described in claim 6 wherein said packer elements are provided with an external circumferential groove.

13. In an apparatus adapted for testing sections of well pipe or the like with a testing fluid, an elongated tester body of smaller diameter than the inside diameter of the well pipe to be tested, at least one packer element mounted exteriorly on each end portion of said tester body, said packer element having a smaller outside diameter than the diameter of the pipe to be tested, means on each end of said tester body abutting said packer element to retain and limit the longitudinal movement of the same, a pair of piston elements slidably mounted on said tester body, one of said piston elements abutting the packer element on one end of said tester body opposite of said means and the other of said piston members abutting the other packer element on the other end of said tester body opposite of said means, means including continuously open passages in said tester body for supplying fluid pressure to move said piston members longitudinally of said tester body against the respective ends of said packer elements to cause said packer elements to compress longitudinally against said retaining means and expand transversely into sealing engagement with the well pipe to seal off a section of the well pipe, means including fluid passages through said tester body and opening to the space between said packer for supplying testing fluid to the space between said packers when said packers are in sealing engagement with the section of well pipe being tested and said fluid pressure supply means for said piston members being operable to supply fluid pressure to said piston members to cause them to initially seal said packer elements and to further increase the seal of said packer elements after testing fluid is applied to the section of well pipe being tested.

References Cited in the file of this patent

UNITED STATES PATENTS

| | | |
|---|---|---|
| 1,802,525 | Newlin | Apr. 28, 1931 |
| 2,241,526 | Rosenkranz | May 13, 1941 |
| 2,319,493 | Drinkard | May 18, 1943 |
| 2,399,125 | Lehnhard | Apr. 23, 1946 |
| 2,715,444 | Fewell | Aug. 16, 1955 |
| 2,731,827 | Loomis | Jan. 24, 1956 |